US012627764B2

(12) United States Patent
Seo et al.

(10) Patent No.: US 12,627,764 B2
(45) Date of Patent: May 12, 2026

(54) VISION SENSOR, IMAGE PROCESSING DEVICE INCLUDING THE SAME, AND OPERATING METHOD OF THE VISION SENSOR

(71) Applicant: SAMSUNG ELECTRONICS CO., LTD., Suwon-si (KR)

(72) Inventors: Jongseok Seo, Seoul (KR); Jaeho Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 18/321,070

(22) Filed: May 22, 2023

(65) Prior Publication Data

US 2023/0300282 A1     Sep. 21, 2023

Related U.S. Application Data

(63) Continuation of application No. 17/525,390, filed on Nov. 12, 2021, now Pat. No. 11,695,895.

(30) Foreign Application Priority Data

Dec. 1, 2020     (KR) ........................ 10-2020-0165942

(51) Int. Cl.
*H04N 5/06*         (2006.01)
*H04N 23/60*        (2023.01)
(52) U.S. Cl.
CPC ............. *H04N 5/06* (2013.01); *H04N 23/665* (2023.01)
(58) Field of Classification Search
CPC ...... H04N 5/06; H04N 23/665; H04N 23/667; H04N 25/00; H04N 5/04; H04N 25/71;
(Continued)

(56) References Cited

U.S. PATENT DOCUMENTS 6,570,617 B2 *   5/2003   Fossum .................. H04N 25/78
                                                          348/E3.018
9,451,163 B2     9/2016   Qiu et al.
(Continued)

FOREIGN PATENT DOCUMENTS

CN          110169050 A      8/2019
CN          111770245 A     10/2020
(Continued)

OTHER PUBLICATIONS

Office Action dated Sep. 8, 2022 in corresponding U.S. Appl. No. 17/525,390.

(Continued)

*Primary Examiner* — Usman A Khan
(74) *Attorney, Agent, or Firm* — Morgan, Lewis & Bockius LLP

(57)               ABSTRACT

Provided are a vision sensor, an image processing device including the same, and an operating method of the vision sensor. The vision sensor includes a pixel array including a plurality of pixels, a synchronization control module configured to receive a synchronization signal from an external image sensor and generate an internal trigger signal based on the synchronization signal, an event detection circuit configured to receive the internal trigger signal and detect whether an event has occurred in the plurality of pixels and generate event signals corresponding to pixels in which the event has occurred, and an interface circuit configured to receive the event signals and transmit to an external processor vision sensor data based on the trigger signal and at least one of the event signals, where the vision sensor data includes matching information for timing image frame information generated by the image sensor and the event signals generated by the vision sensor.

20 Claims, 15 Drawing Sheets

(58) Field of Classification Search
CPC ...... H04N 25/77; H04N 25/75; H04N 25/745; H04N 25/76
USPC ......................................................... 348/294
See application file for complete search history.

(56) References Cited

U.S. PATENT DOCUMENTS

| | | | |
|---|---|---|---|
| 10,157,325 | B2 | 12/2018 | Zamfir et al. |
| 10,237,506 | B2 | 3/2019 | Park et al. |
| 10,567,679 | B2 | 2/2020 | Berner et al. |
| 10,715,750 | B2 | 7/2020 | Berner et al. |
| 2006/0029272 | A1 | 2/2006 | Ogawa |
| 2006/0204038 | A1* | 9/2006 | Yokota ................. H04N 13/239 348/42 |
| 2011/0187878 | A1 | 8/2011 | Mor et al. |
| 2014/0043434 | A1 | 2/2014 | Asano et al. |
| 2014/0125994 | A1 | 5/2014 | Kim et al. |
| 2016/0140731 | A1* | 5/2016 | Lee ........................ H04N 25/47 382/107 |
| 2017/0310945 | A1 | 10/2017 | Juang et al. |
| 2018/0041704 | A1 | 2/2018 | Jo et al. |
| 2018/0136314 | A1* | 5/2018 | Taylor ................... G01S 17/931 |
| 2018/0275242 | A1 | 9/2018 | Peri |
| 2019/0356849 | A1 | 11/2019 | Sapienza et al. |
| 2020/0099921 | A1 | 3/2020 | Hicks |
| 2020/0111220 | A1 | 4/2020 | Delbruck et al. |
| 2020/0344451 | A1 | 10/2020 | Kindo |
| 2022/0174187 | A1 | 6/2022 | Seo et al. |

FOREIGN PATENT DOCUMENTS

| | | |
|---|---|---|
| KR | 10-2014-0146337 A | 12/2014 |
| KR | 10-2019-0102223 A | 9/2019 |
| KR | 10-2020-0029328 A | 3/2020 |

OTHER PUBLICATIONS

Notice of Allowance dated Feb. 24, 2023 in corresponding U.S. Appl. No. 17/525,390.
Office Action dated Mar. 27, 2025 issued in corresponding Chinese Patent Application No. 202111438520.7. (Note: US 2006-0204038 A1 cited in prior IDS.).
Office Action dated May 30, 2025 issued in corresponding Korean Patent Application No. 10-2020-0165942.

\* cited by examiner

VISION SENSOR, IMAGE PROCESSING DEVICE INCLUDING THE SAME, AND OPERATING METHOD OF THE VISION SENSOR

CROSS-REFERENCE TO RELATED APPLICATION(S)

This U.S. non-provisional patent application is a continuation of co-pending U.S. patent application Ser. No. 17/525,390, titled VISION SENSOR, IMAGE PROCESSING DEVICE INCLUDING THE SAME, AND OPERATING METHOD OF THE VISION SENSOR and filed on Nov. 12, 2021, which, in turn, claims priority under 35 U.S.C. § 119 to Korean Patent Application No. 10-2020-0165942, filed on Dec. 1, 2020, in the Korean Intellectual Property Office, the disclosures of which are incorporated by reference herein in their entireties.

FIELD

The present disclosure relates to vision sensors, and more particularly, to a vision sensor that may synchronize with a complementary metal-oxide-semiconductor (CMOS) image sensor (CIS) and other devices by using a timestamp, an image processing device including the vision sensor, and an operating method of the vision sensor.

DISCUSSION OF RELATED ART

When an event (e.g., a change in intensity of light) occurs, a vision sensor, for example, a dynamic vision sensor, generates information about the event, that is, an event signal, and transmits the event signal to a processor. When event signals of the vision sensor are linked to an image sensor, various functions such as de-blur or super slow may be supported.

Vision sensors may synchronize in a slave mode by receiving signals from a host, but an increased efficiency method of synchronizing with a CIS or the like may be used as the utilization of vision sensors increases.

SUMMARY

The present disclosure provides a vision sensor that uses a timestamp to synchronize internal/external devices of a camera including an image sensor, a gyro sensor, and an infrared light-emitting diode (LED), and further provides an image processing device including the vision sensor, and an operating method of the vision sensor.

According to an embodiment of the present disclosure, there is provided a vision sensor including a pixel array comprising a plurality of pixels; a synchronization control module configured to receive a synchronization signal from an external image sensor, and generate an internal trigger signal based on the synchronization signal; an event detection circuit configured to receive the internal trigger signal, detect whether an event has occurred in the plurality of pixels, and generate event signals corresponding to pixels in which the event has occurred; and an interface circuit configured to receive the event signals, transmit to an external processor vision sensor data based on the trigger signal and at least one of the event signals, wherein the vision sensor data comprises matching information for timing image frame information generated by the image sensor and the event signals generated by the vision sensor.

According to an embodiment of the present disclosure, there is provided an image processing device including an image sensor configured to generate a synchronization signal based on at least one of shutter signal information, read signal information, and image frame information, the shutter signal information comprising information of an exposure time point at which an exposure of a pixel of a pixel array starts or stops, the read signal information comprising information of an operation time point at which a voltage of the pixel of the pixel array is detected, and the image frame information comprising information of a generation time point at which an image frame is generated; a vision sensor configured to generate an internal trigger signal based on the synchronization signal received from the image sensor, generate a plurality of event signals corresponding to a plurality of pixels in which an event has occurred due to a movement of an object among a plurality of pixels comprised in the pixel array, generate a timestamp based on the internal trigger signal, and output vision sensor data comprising at least one of the event signals and the timestamp; and a processor configured to match image sensor data received from the image sensor with the vision sensor data received from the vision sensor.

According to an embodiment of the present disclosure, there is provided an operating method of a vision sensor, the method including: generating an internal trigger signal based on a synchronization signal received from an image sensor; detecting whether an event has occurred in a plurality of pixels, generating event signals corresponding to pixels in which the event has occurred, and generating a timestamp based on the internal trigger signal; and communicating with an external processor and transmitting vision sensor data comprising at least one of the event signals and the timestamp to the external processor, wherein the timestamp comprises matching information for timing image frame information generated by the image sensor and the event signals generated by the vision sensor.

BRIEF DESCRIPTION OF THE DRAWINGS

Embodiments of the present disclosure will be more clearly understood from the following detailed description taken in conjunction with the accompanying drawings, in which.

DETAILED DESCRIPTION

Hereinafter, embodiments of the present disclosure will be described below with reference to accompanying drawings.

Figure 1A:
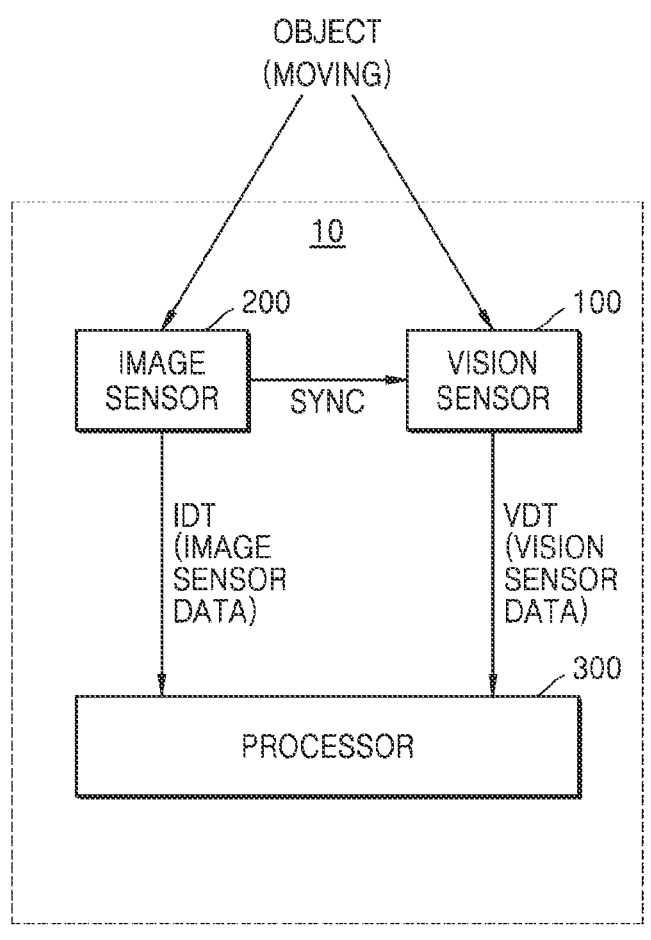
FIGS. 1A and 1B are block diagrams of an image processing device according to an embodiment of the present disclosure.
Figure 1B:
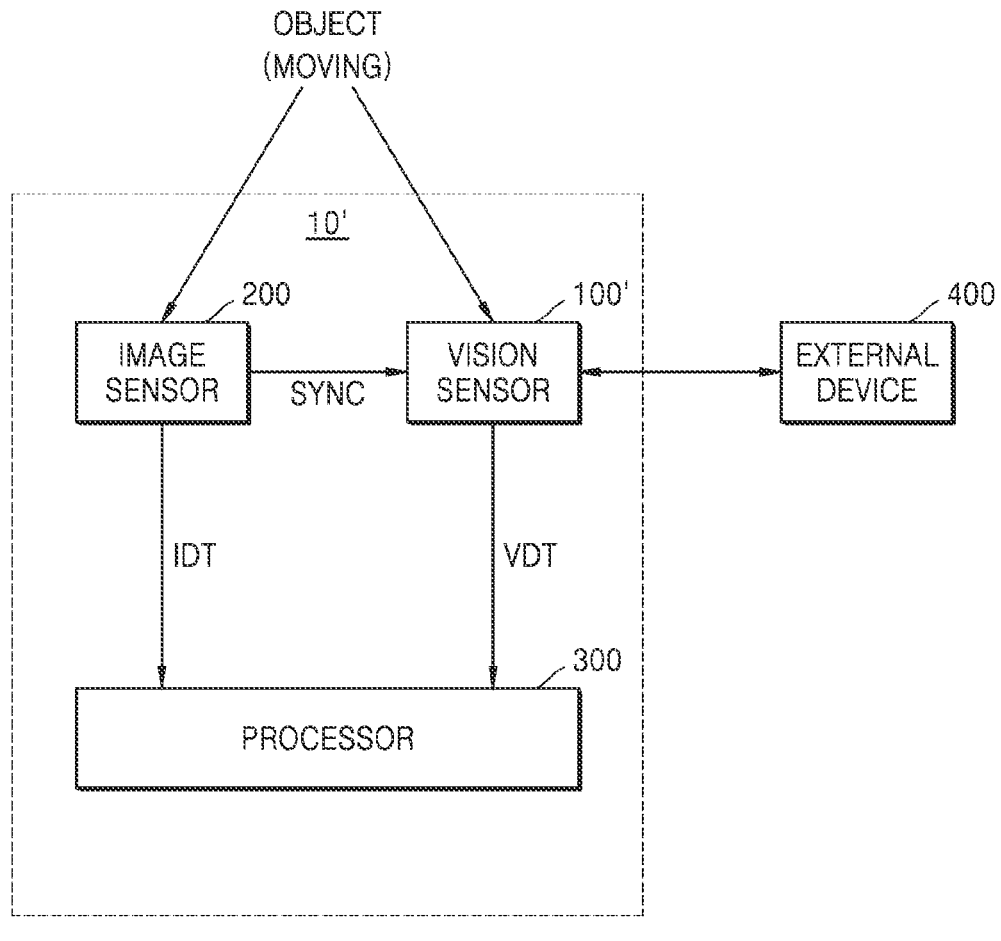

FIGS. 1A and 1B illustrate image processing devices according to an embodiment of the present disclosure.

The image processing device 10 or 10', according to respective embodiments of the present disclosure, may be mounted on an electronic apparatus having an image or light sensing function. For example, the image processing device 10 or 10' may be mounted on an electronic apparatus such as a camera, a smartphone, a wearable apparatus, an Internet of Things (IoT) apparatus, a tablet personal computer (PC), a personal digital assistant (PDA), a portable multimedia player (PMP), a navigation apparatus, a drone, an advanced drivers assistance system (ADAS), or the like. In addition, the image processing device 10 or 10' may be provided as a component for vehicles, furniture, manufacturing facilities, doors, various measurement apparatuses, or the like.

Referring to FIG. 1A, the image processing device 10 may include a vision sensor 100, an image sensor 200, and a processor 300.

The vision sensor 100 may output an event signal by detecting a change in intensity of incident light. The incident light may be light of a visible wavelength and/or light of a non-visible wavelength, such as infrared or ultraviolet light. The vision sensor 100 may include a dynamic vision sensor that outputs event signals about pixels in which a change in light is detected, that is, pixels in which an event has occurred. A change in intensity of light may be caused by movement of an object to be captured by the vision sensor 100, or may be caused by movement of the vision sensor 100 or the image processing device 10. The vision sensor 100 may periodically or aperiodically transmit vision sensor data VDT including event signals to the processor 300.

The vision sensor 100 may generate a timestamp that may match an image frame generated by the image sensor 200 with an event signal generated by the vision sensor 100 based on a synchronization signal SYNC received from the image sensor 200 and transmit the vision sensor data VDT including the generated timestamp to the processor 300. In an alternate embodiment, the synchronization signal SYNC or an internal signal of the vision sensor 100 may be sent from the vision sensor 100 to the image sensor 200 and/or the processor 300.

The timestamp may include information of a time when the image sensor 200 is exposed, a time where an image frame is generated, or a time where an event signal of the vision sensor 100 is generated. The timestamp may include a reference timestamp that increases a preset value when an internal trigger signal is generated and a sub timestamp that increases the preset value when an event signal is generated.

In addition, the vision sensor 100 may output an external synchronization output signal (e.g., ESO of FIG. 2A) for synchronizing external devices including the image sensor 200 with the vision sensor 100 by using the synchronization signal SYNC received from the image sensor 200 or an internal signal of the vision sensor 100. The vision sensor 100 may output a plurality of device synchronization signals and individually control the plurality of device synchronization signals.

The image sensor 200 may convert an optical signal of an object incident through an optical lens into an electrical signal and generate image data IDT based on the electrical signal. The image sensor 200 may include, for example, a pixel array including a plurality of pixels arranged two-dimensionally and a readout circuit, and the pixel array may convert received optical signals into electrical signals. The pixel array may include, for example, a photoelectric conversion device, such as a charge-coupled device (CCD), a complementary metal oxide semiconductor (CMOS), or the like, and may also include various types of photoelectric conversion devices. The readout circuit may generate raw data based on an electrical signal provided from the pixel array and output, as the image data IDT, the raw data or the raw data on which pre-processing such as removal of bad pixels or the like has been performed. The image sensor 200 may include a semiconductor chip or package including the pixel array and the readout circuit.

The image sensor 200 may generate a synchronization input signal to be transmitted to the vision sensor 100 to allow the vision sensor 100 and the image sensor 200 to synchronize with each other. The synchronization input signal may be generated by considering shutter signal information, readout signal information, or image frame information of the image sensor 200.

The processor 300 may perform image processing on the image data IDT provided from the image sensor 200. For example, the processor 300 may perform image processing (e.g., changing Bayer patterned image data into a YUV or RGB format) that changes a data format with respect to the image data IDT, image processing for changing image quality, such as noise removal, brightness adjustment, and sharpness adjustment, or the like. The processor 300 may process event signals received from the vision sensor 100 and detect movement of an object (or movement of an object in an image recognized by the image processing device 10).

In addition, the processor 300 may match an image frame included in the image data IDT provided by the image sensor 200 with the vision sensor data VDT received from the vision sensor 100 by using the timestamp and synchronization signal information. The processor 300 may include an application specific integrated circuit (ASIC), a field-programmable gate array (FPGA), a dedicated microprocessor, a microprocessor, a general purpose processor, or the like. In an embodiment, the processor 300 may include an application processor or an image processing processor.

The vision sensor 100, the image sensor 200, and the processor 300 may each be implemented as an integrated circuit (IC). For example, the vision sensor 100, the image sensor 200, and the processor 300 may be implemented as separate semiconductor chips. Alternatively, the vision sensor 100, the image sensor 200, and the processor 300 may be implemented as a single chip. For example, the vision sensor 100, the image sensor 200, and the processor 300 may be implemented as a system-on-a-chip (SoC).

Referring to FIG. 1B, an image processing device 10' is similar to the image processing device 10, so duplicate description may be omitted. The image processing device 10' may include a vision sensor 100', control an external device 400 and collect data from the external device 400. The external device 400 may include an acceleration sensor, an inertial measurement unit (IMU), a gyro sensor, an infrared (IR) light-emitting diode (LED), a flashlight, or the like.

The acceleration sensor is a sensor measuring the acceleration or the strength of an impact of a moving object, and may measure dynamic forces such as acceleration, vibration, and impact of an object by processing an output signal.

The gyro sensor is a sensor used for position measurement and direction setting by using the dynamic motion of a rotating object.

The IR LED is configured to capture an image in a place with light and is a device used for CCTV cameras or the like.

The IMU uses an accelerometer, a tachometer, and sometimes a combination of magnetometers, and recently serves as a direction sensor in many consumer products such as mobile phones and cameras. The IMU may operate by sensing linear acceleration using at least one accelerator and sensing rotational speed using at least one gyroscope, and may include a magnetometer in some cases. A general configuration may include an accelerator, a gyroscope, and a magnetometer for each axis with respect to three axes of pitch, roll, and yaw.

Figure 2A:
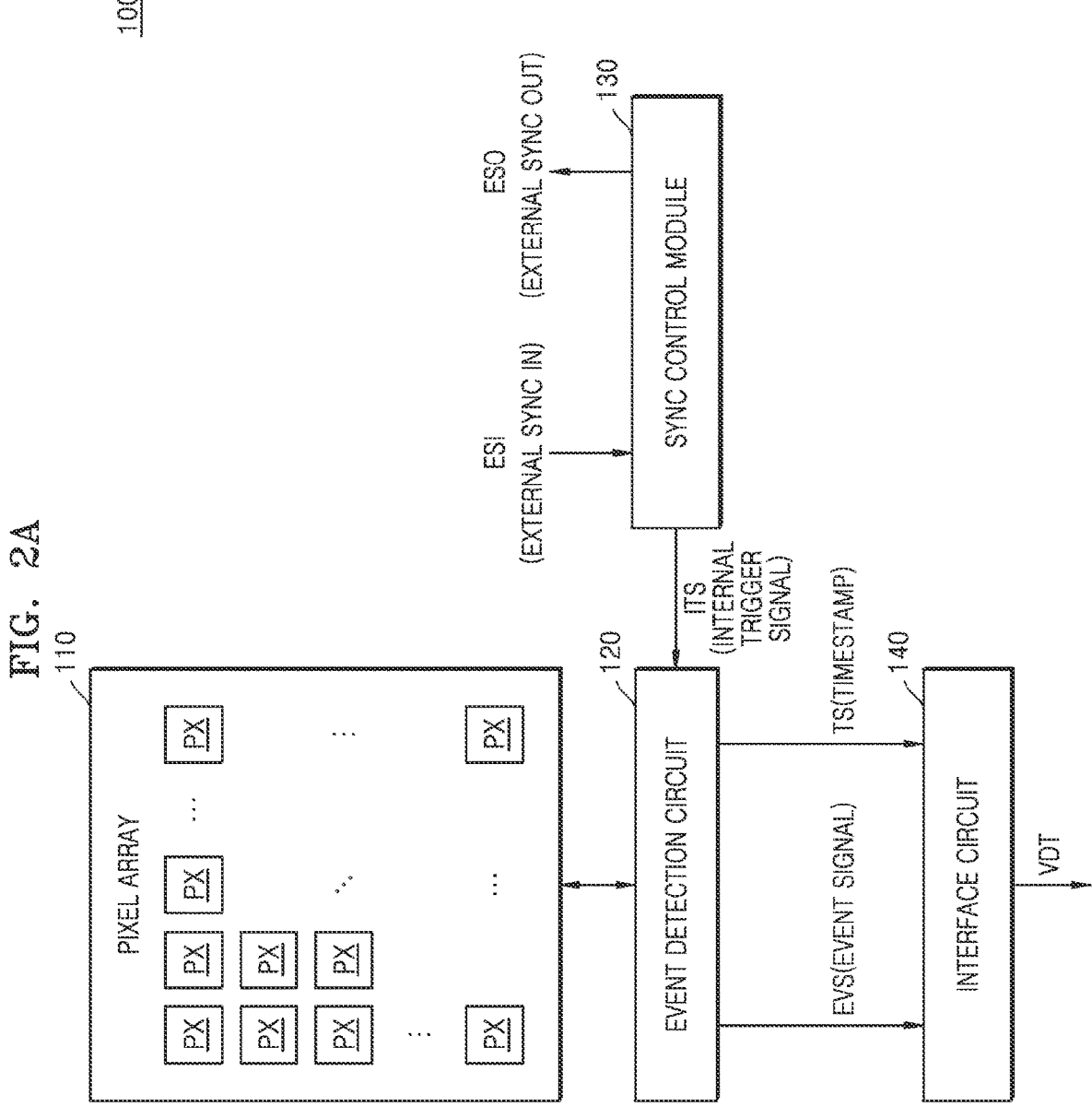
FIGS. 2A and 2B are block diagrams of a vision sensor according to an embodiment of the present disclosure.
Figure 2B:
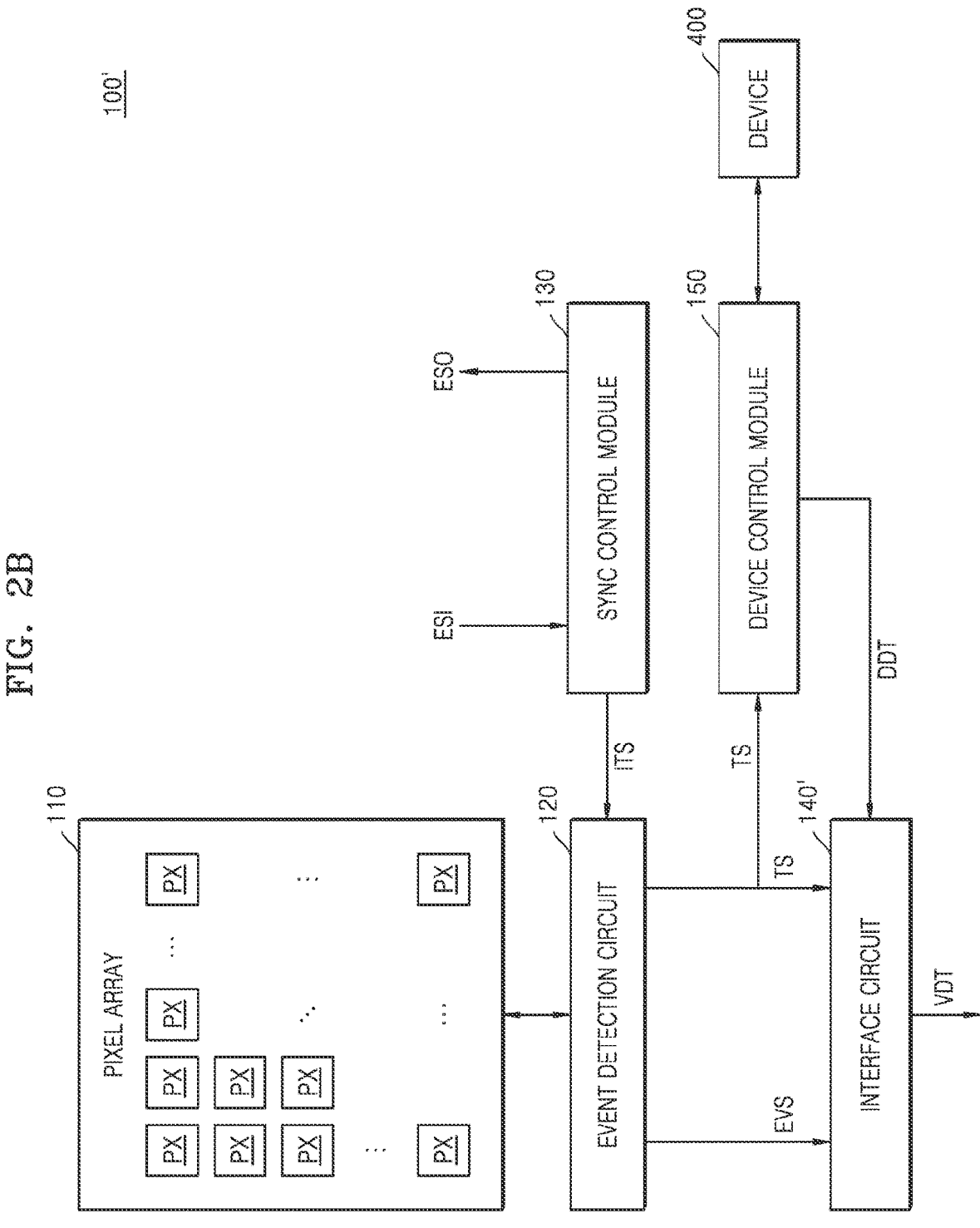

FIGS. 2A and 2B illustrate the vision sensors 100 and 100' according to respective embodiments of the present disclosure.

Referring to FIG. 2A, the vision sensor 100 may include a pixel array 110, an event detection circuit 120, a synchronization control module 130, and an interface circuit 140.

The pixel array 110 may include a plurality of pixels PX arranged in a matrix form. Each of the plurality of pixels PX may sense events in which the intensity of received light increases or decreases. For example, each of the plurality of pixels PX may be connected to the event detection circuit 120 through a column line extending in a column direction and a row line extending in a row direction. A signal indicating that an event has occurred and polarity information of an event (i.e., whether the event is an on-event where the intensity of light increases or an off-event where the intensity of light decreases) may be output from the pixel PX in which the event has occurred, to the event detection circuit 120.

The event detection circuit 120 may read events from the pixel array 110 and process the events. The event detection circuit 120 may generate the event signal EVS including the polarity information of an occurred event, an address of the pixel PX in which the event has occurred, and a timestamp TS. The event detection circuit 120 may generate the timestamp TS including synchronization information by receiving an internal trigger signal ITS generated by the synchronization control module 130.

The event detection circuit 120 may process events that occurred in the pixel array 110 on a pixel unit, a pixel group unit including a plurality of pixels PX, a column unit, or a frame unit.

The synchronization control module 130 may generate the internal trigger signal ITS based on an external synchronization input signal ESI received from the image sensor 200, such as the synchronization signal SYNC of FIGS. 1A and 1B, without limitation thereto. The synchronization control module 130 may generate the internal trigger signal ITS by using a delay value included in the external synchronization input signal ESI received from the image sensor 200 or other devices. The delay value may be a preset value. Embodiments to which the delay value is applied will be described below with reference to FIGS. 5B, 5C, and 6.

In an embodiment, the synchronization control module 130 may generate the external synchronization output signal ESO based on the external synchronization input signal ESI received from the image sensor 200. Alternatively, in an embodiment, the synchronization control module 130 may generate the external synchronization output signal ESO by using an internal signal of the vision sensor 100 instead of the external synchronization input signal ESI. The synchronization control module 130 may generate a plurality of external synchronization output signals ESO1 to ESOn, and may independently control each of the plurality of external synchronization output signals ESO1 to ESOn.

The interface circuit 140 may receive the event signal EVS and the timestamp TS, and transmit the vision sensor data VDT to a processor (300 of FIG. 1) according to a set protocol. The interface circuit 140 may generate the vision sensor data VDT by packing the event signals EVS and the timestamp TS in an individual signal unit, a packet unit, or a frame unit according to the set protocol, and transmit the vision sensor data VDT to the processor 300. For example, the interface circuit 140 may include mobile industry processor interface (MIPI) interfaces, and may use a D-PHY, which is an interface between a camera and a display among the MIPI interfaces.

The interface circuit 140 may output a packet including at least one event signal EVS and the timestamp TS as the vision sensor data VDT. The packet may include the timestamp TS, an address ADDR, and polarity information Pol in FIG. 3, and an arrangement order thereof is not limited. A header indicating a start of the packet may be added at a front end of the packet, and a tail indicating an end of the packet may be added at a rear end of the packet. The packet may include at least one event signal EVS.

The timestamp TS may include information of a time in which an event has occurred. For example, the timestamp TS may include 32 bits, but is not limited thereto.

The address ADDR may include a plurality of bits, for example, each may include 8 bits. In this case, a vision sensor including a plurality of pixels arranged in up to eight rows and eight columns may be supported. However, the present disclosure is not limited thereto, and the number of bits of the address ADDR may vary according to the number of pixels.

The polarity information Pol may include information of an on-event and an off-event. For example, the polarity information Pol may include 1 bit including information of whether an on-event has occurred and 1 bit including information of whether an off-event has occurred. For example, both of a bit indicating an on-event and a bit indicating an off-event may not be "1", but both may be "0".

Referring to FIG. 2B, a vision sensor 100' is similar to the vision sensor 100, so duplicate description may be omitted. The vision sensor 100' may include the pixel array 110, the event detection circuit 120, the synchronization control module 130, an interface circuit 140', and a device control module 150.

The device control module 150 may receive the timestamp TS generated by the event detection circuit 120 and synchronize the timestamp TS with data received from the external device 400 including an IMU, a gyro sensor, an IR LED, and a flashlight. The device control module 150 may transmit device data DDT including information of the timestamp TS to the interface circuit 140'. For example, the device data DDT may include matching information of data received from the gyro sensor and the event signal EVS of the event detection circuit 120, and the interface circuit 140' may synchronize the event signal EVS, gyro sensor data, and the timestamp TS to generate the vision sensor data VDT and transmit the vision sensor data VDT to the processor 300.

Hereinafter, the expression that the event signals EVS, the timestamp TS, or the device data DDT are output means that the event signals EVS, the timestamp TS, or the device data DDT may be converted into the vision sensor data VDT through the interface circuit 140', and the vision sensor data VDT is transmitted to the processor 300.

Figure 3:
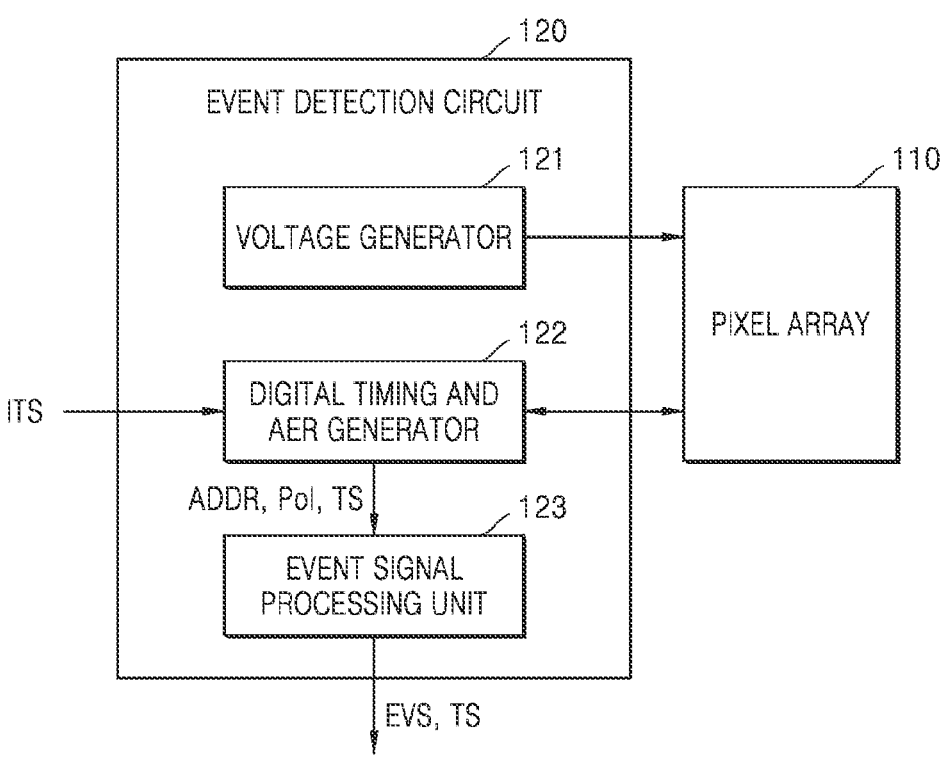
FIG. 3 is a block diagram of an event detection circuit according to an embodiment of the present disclosure.

FIG. 3 illustrates the event detection circuit 120 according to an embodiment of the present disclosure;

Referring to FIG. 3, the event detection circuit 120 may include a voltage generator 121, a digital timing and address event representation (AER) generator (DTAG) 122, and an event signal processing (ESP) unit 123. The DTAG may include a column AER generator, a row AER generator, and a timestamp generator.

The voltage generator 121 may generate a voltage to be provided to the pixel array 110. For example, the voltage generator 121 may generate threshold voltages or bias voltages to be used to detect an on-event and an off-event in the pixel PX. The voltage generator 121 may change voltage levels of the threshold voltages to be provided to pixels PX of a region of interest, and may differently change the voltage levels of the threshold voltages for each of a plurality of regions of interest.

The DTAG 122 may receive a signal notifying the occurrence of an event from the pixel PX where the event has occurred and generate the timestamp TS about a time when the event of the pixel PX has occurred, the polarity information Pol, and the address ADDR including a column address, a row address, or a group address.

For example, the column AER generator may receive, from the pixel PX where the event has occurred, a signal notifying the occurrence of an event, for example, a column request, and generate a column address of the pixel PX where the event has occurred.

The row AER generator may receive a signal notifying the occurrence of an event, for example, a row request, from the pixel PX where the event has occurred, and generate a row address of the pixel PX where the event has occurred. A group address in preset group units may also be generated instead of generating the row address by the row AER generator.

In an embodiment, the pixel array 110 may be scanned in column units, and when the column AER generator receives a request from a particular column, for example, a first column, the column AER generator may transmit a response signal to the first column. The pixel PX in which the event has occurred and which has received the response signal may transmit the polarity information Pol (e.g., a signal indicating the occurrence of an on-event or an off-event) to the row AER generator. Upon receiving the polarity information Pol, the row AER generator may transmit a reset signal to the pixel PX where the event has occurred. The pixel PX where the event has occurred may be reset in response to the reset signal. The row AER generator may control a period in which the reset signal is generated. The row AER generator may generate information about a time when an event occurs, that is, the timestamp TS.

Operations of the row AER generator and the column AER generator have been described on the assumption that the pixel array 110 is scanned in column units. However, the operations of the row AER generator and the column AER generator are not limited thereto, and the row AER generator and the column AER generator may read whether an event has occurred and the polarity information Pol from the pixel PX where the event has occurred in various ways. For example, the pixel array 110 may also be scanned in row units, and the operations of the row AER generator and the column AER generator may be changed, that is, the column AER generator may receive the polarity information Pol and transmit a reset signal to the pixel array 110. In addition, the row AER generator and the column AER generator may individually access the pixel PX where the event has occurred.

The DTAG 122 may generate the timestamp TS based on the internal trigger signal ITS. The event signal EVS generated by the vision sensor 100 may be matched with an image frame generated by the image sensor 200 through the generated timestamp TS. A method of generating the timestamp TS for matching will be described in detail below with reference to FIGS. 7A to 7C.

The ESP unit 123 may generate the event signal EVS based on the address ADDR, the polarity information Pol, and the timestamp TS received from the DTAG 122.

Figure 4A:
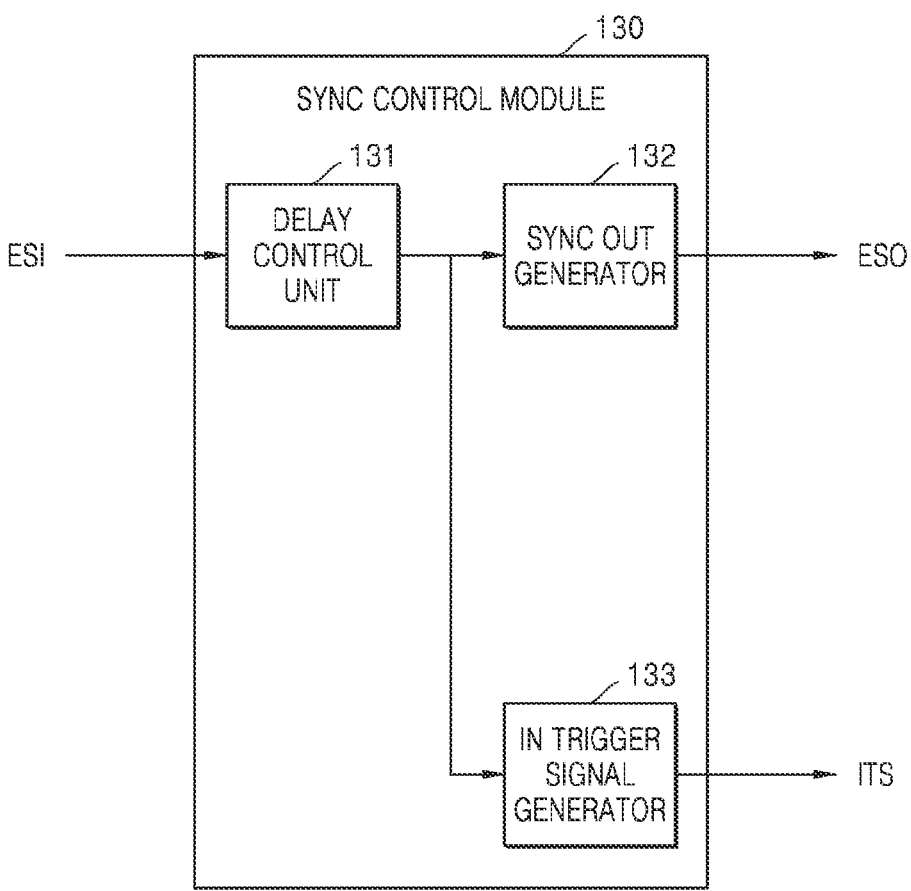
FIGS. 4A and 4B are block diagrams of a synchronization control module according to an embodiment of the present disclosure.
Figure 4B:
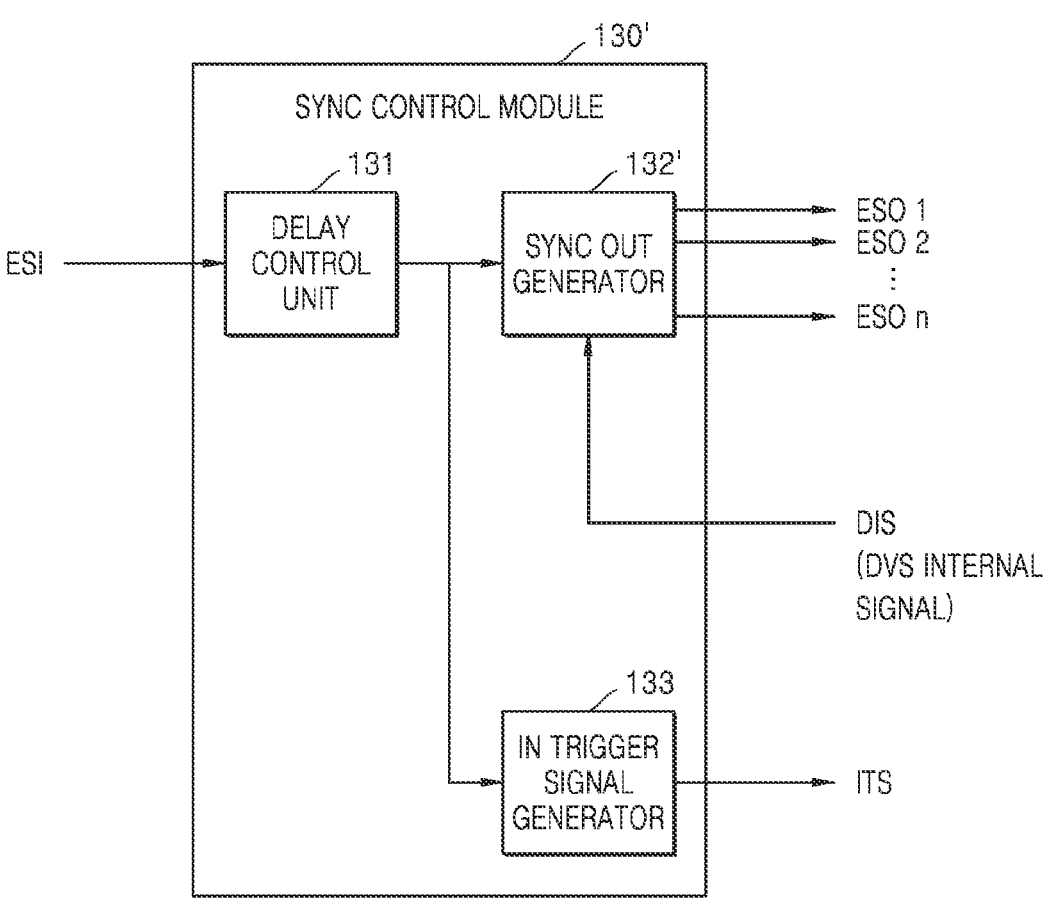

FIGS. 4A and 4B illustrate synchronization control modules 130 and 130' according to respective embodiments of the present disclosure.

Referring to FIG. 4A, the synchronization control module 130 may include a delay control unit 131, a synchronization output signal generator 132, and an internal trigger signal generator 133.

The delay control unit 131 may generate a delayed synchronization input signal for the internal use of the vision sensor 100 by applying a delay value set by a user to an external signal for synchronization including the external synchronization input signal ESI. The synchronization output signal generator 132 may generate the external synchronization output signal ESO by using the external synchronization input signal ESI or the delayed synchronization input signal. The internal trigger signal generator 133 may generate the timestamp TS or generate the internal trigger signal ITS used for controlling the DTAG 122 by using the external synchronization input signal ESI or the delayed synchronization input signal.

Referring to FIG. 4B, a synchronization control generator 130' is similar to the synchronization control generator 130, so duplicate description may be omitted. The synchronization control generator 130' includes a synchronization output signal generator 132', which may generate external synchronization output signals ESO1 to ESOn by using a dynamic vision sensor (DVS) internal signal DIS of a vision sensor based on the vision sensor 100 with the synchronization control generator 130' substituted for the synchronization control generator 130, or a vision sensor based on the vision sensor 100' with the synchronization control generator 130' substituted for the synchronization control generator 130, instead of the external synchronization input signal ESI. The synchronization signal generator 132' may generate a plurality of external synchronization output signals ESO1 to ESOn, and may independently control each of the plurality of external synchronization signals ESO1 to ESOn.

Figure 5A:
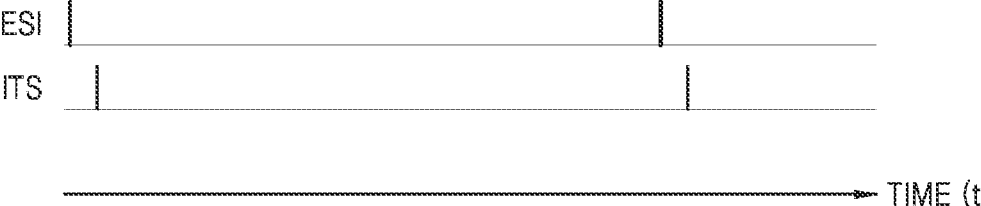
FIGS. 5A to 5C are graphical diagrams illustrating operation modes of an internal trigger generator according to an embodiment of the present disclosure.
Figure 5B:
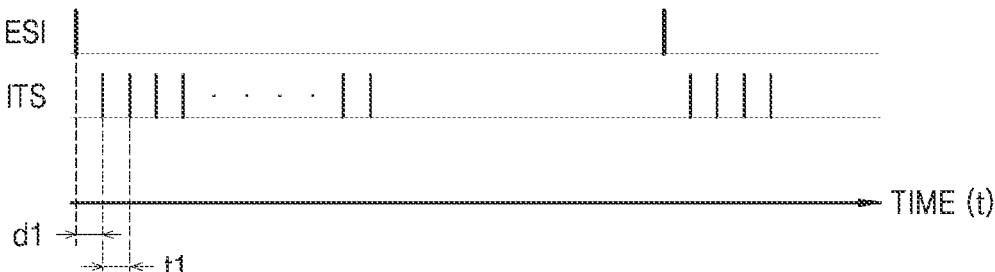
Figure 5C:
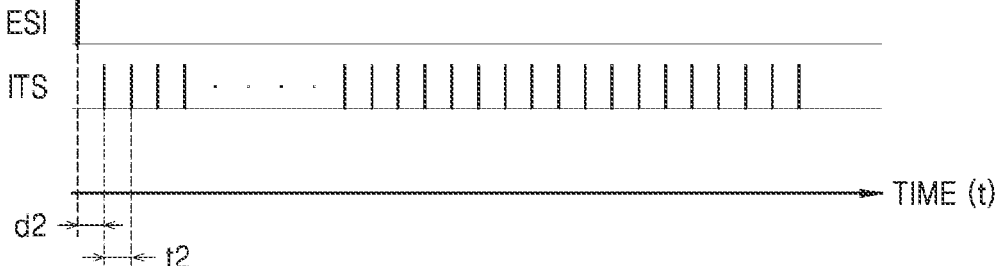

FIGS. 5A to 5C illustrate operation modes of the internal trigger generator 133 according to an embodiment of the present disclosure.

The internal trigger generator 133 may generate the timestamp TS or generate the internal trigger signal ITS for controlling the DTAG 122 by using the external synchronization input signal ESI or a signal to which a delay value is applied.

For example, the internal trigger generator 133 may support three output modes. Referring to FIG. 5A, the internal trigger generator 133 may operate in a single-intrigger-mode in which one internal trigger signal ITS is generated whenever the external synchronization input signal ESI is generated. Referring to FIG. 5B, the internal trigger generator 133 may operate in a burst-single-in-trigger-mode in which N preset internal trigger signals ITS are generated whenever the external synchronization input signal ESI is generated. At this time, the internal trigger signal ITS may be generated N times in a set period t1 after a set delay value d1. Referring to FIG. 5C, the internal trigger generator 133 may operate in a continuous burst mode in which a plurality of preset internal trigger signals ITS or infinite internal trigger signals ITS are generated when the external synchronization input signal ESI is generated. At this time, the internal trigger signal ITS may be continuously generated in a set period t2 after a set delay value d2. In this case, the internal trigger generator 133 may control the pulse width of the generated internal trigger signal ITS or synchronize the pulse width of the generated internal trigger signal ITS with an external clock signal.

Figure 6:
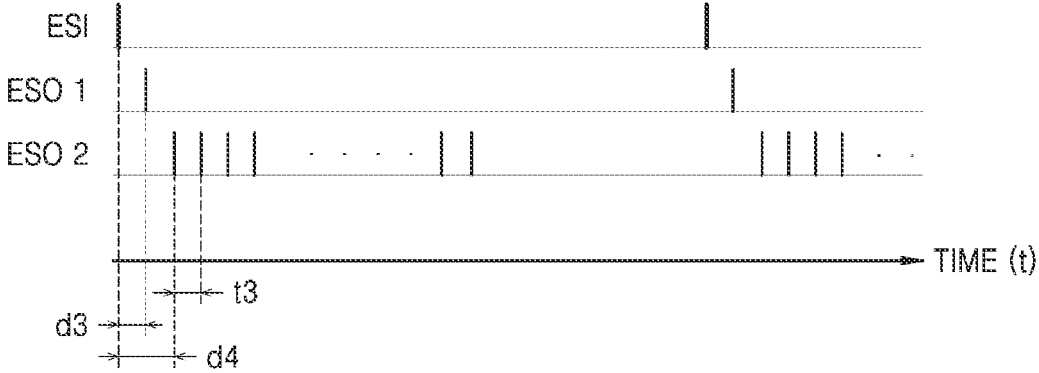
FIG. 6 is a graphical diagram illustrating an operating method of a synchronization signal generator according to an embodiment of the present disclosure.

FIG. 6 illustrates an operating method of the synchronization signal generator 132 according to an embodiment of the present disclosure.

Referring to FIG. 6, the synchronization signal generator 132 may generate first and second external synchronization output signals ESO1 and ESO2 by using the external synchronization input signal ESI or a signal to which a delay value is applied. The first and second external synchronization output signals ESO1 and ESO2 may be at least some of the plurality of external synchronization output signals ESO1 to ESOn of FIG. 4B.

The synchronization signal generator 132 may support three output modes, similar to the internal trigger generator 133 described with reference to FIGS. 5A to 5C. The synchronization signal generator 132 or 132' may operate in a single-in-trigger-mode in which one external synchronization output signal ESO is generated whenever the external synchronization input signal ESI is generated, a burst-single-in-trigger-mode in which N preset external synchronization output signals ESO1 to ESOn are generated whenever the external synchronization input signal ESI is generated, or a continuous burst mode in which a plurality of preset external synchronization output signals ESO1 to ESOn or infinite external synchronization output signals ESO1 to ESOn are generated when the external synchronization input signal ESI is generated.

For example, the synchronization signal generator 132 may generate a signal in the single-in-trigger-mode having a delay value d3 in the first external synchronization output signal ESO1, and may generate a signal at a certain period t3 in the burst-single-in-trigger-mode having a delay value d4 in the second external synchronization output signal ESO2.

The synchronization signal generator 132 may generate a plurality of external synchronization output signals ESO1 to ESOn, and may apply different output modes for each of the plurality of external synchronization output signals ESO1 to ESOn generated. For example, the synchronization signal generator 132 may operate in the single-in-trigger-mode for the first external synchronization output signal ESO1 and operate in the burst-single-in-trigger-mode for the second external synchronization output signal ESO2.

Figure 7A:
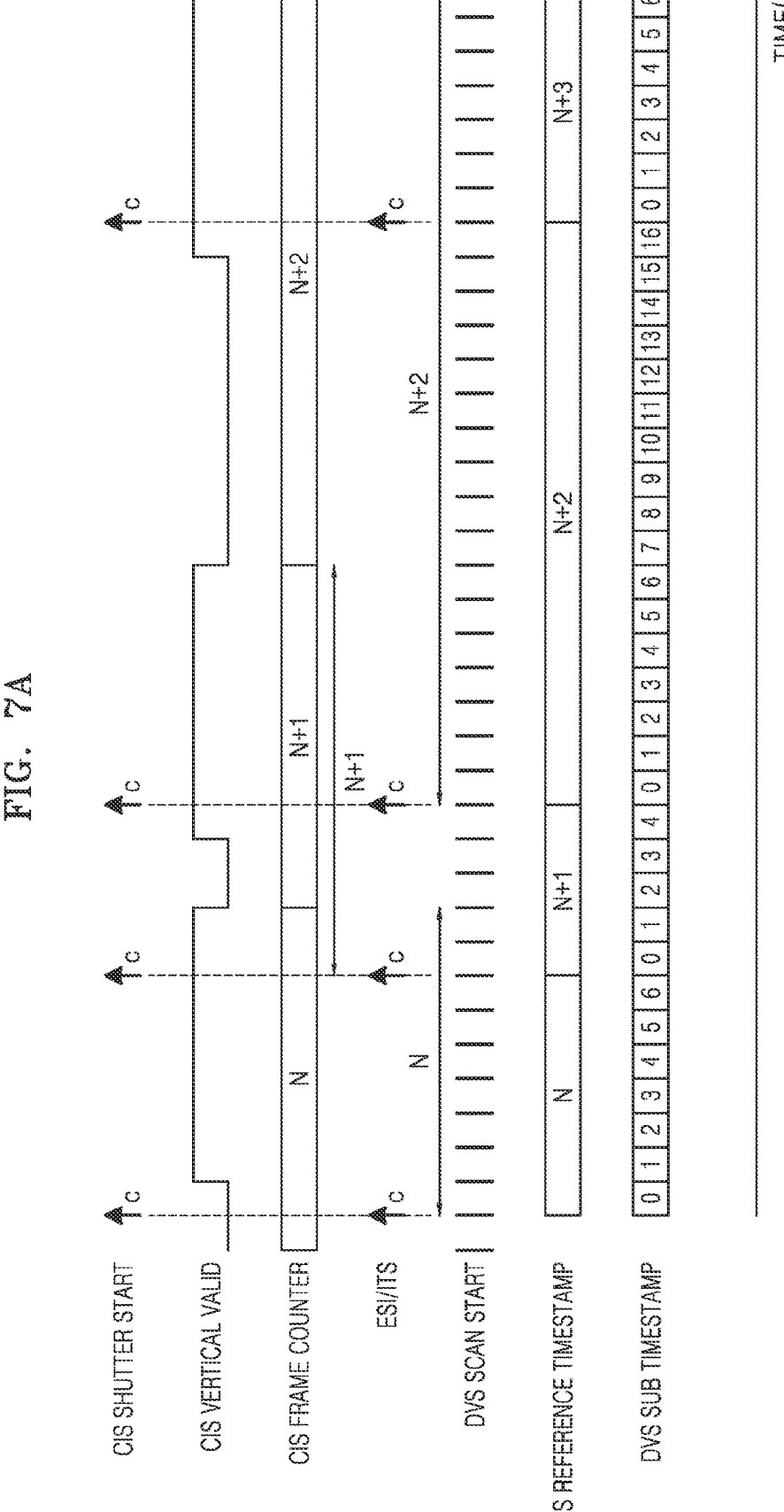
FIGS. 7A to 7C are graphical diagrams illustrating a method by which a vision sensor generates a timestamp according to a synchronization input signal according to an embodiment of the present disclosure.
Figure 7B:
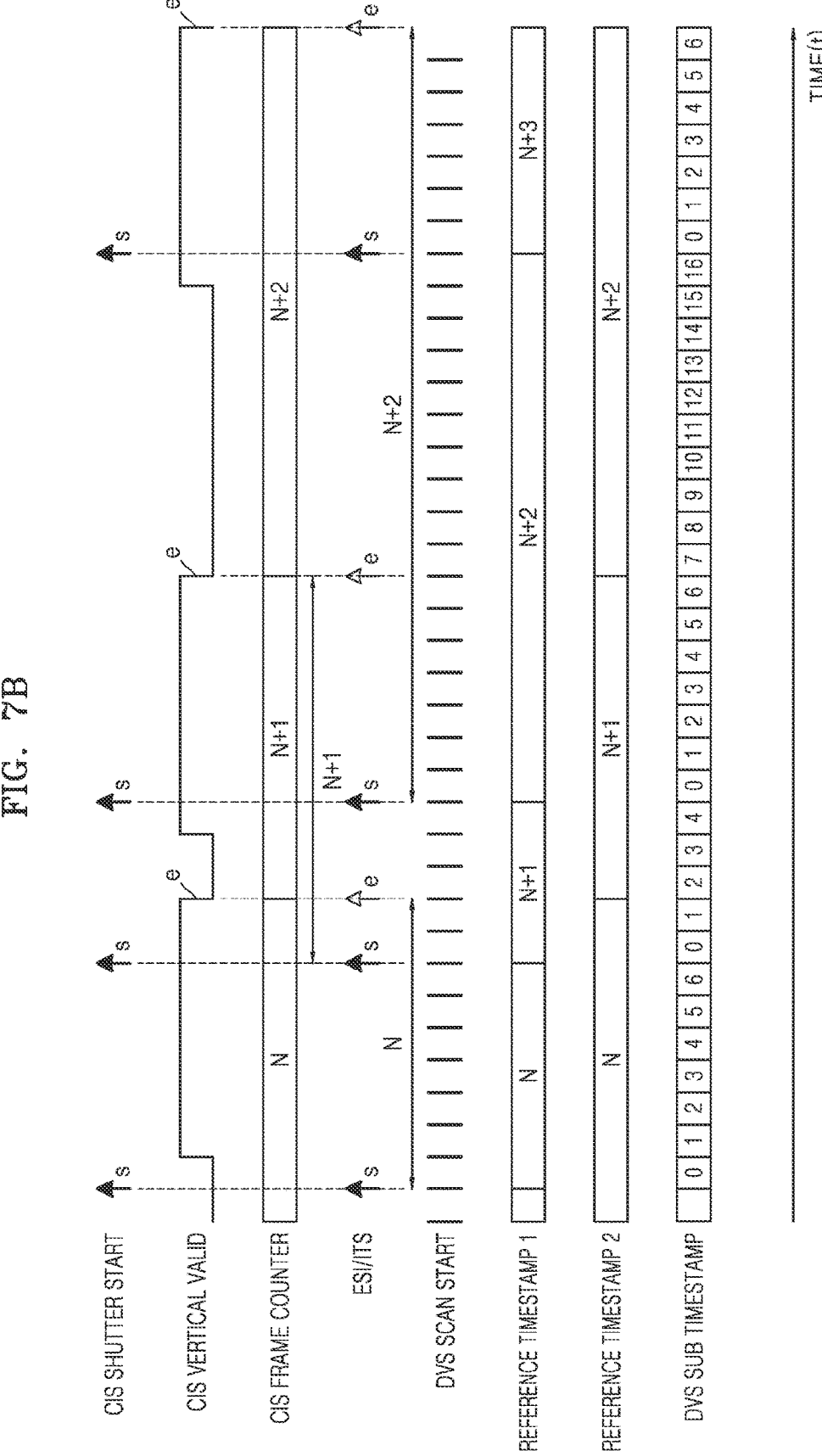
Figure 7C:
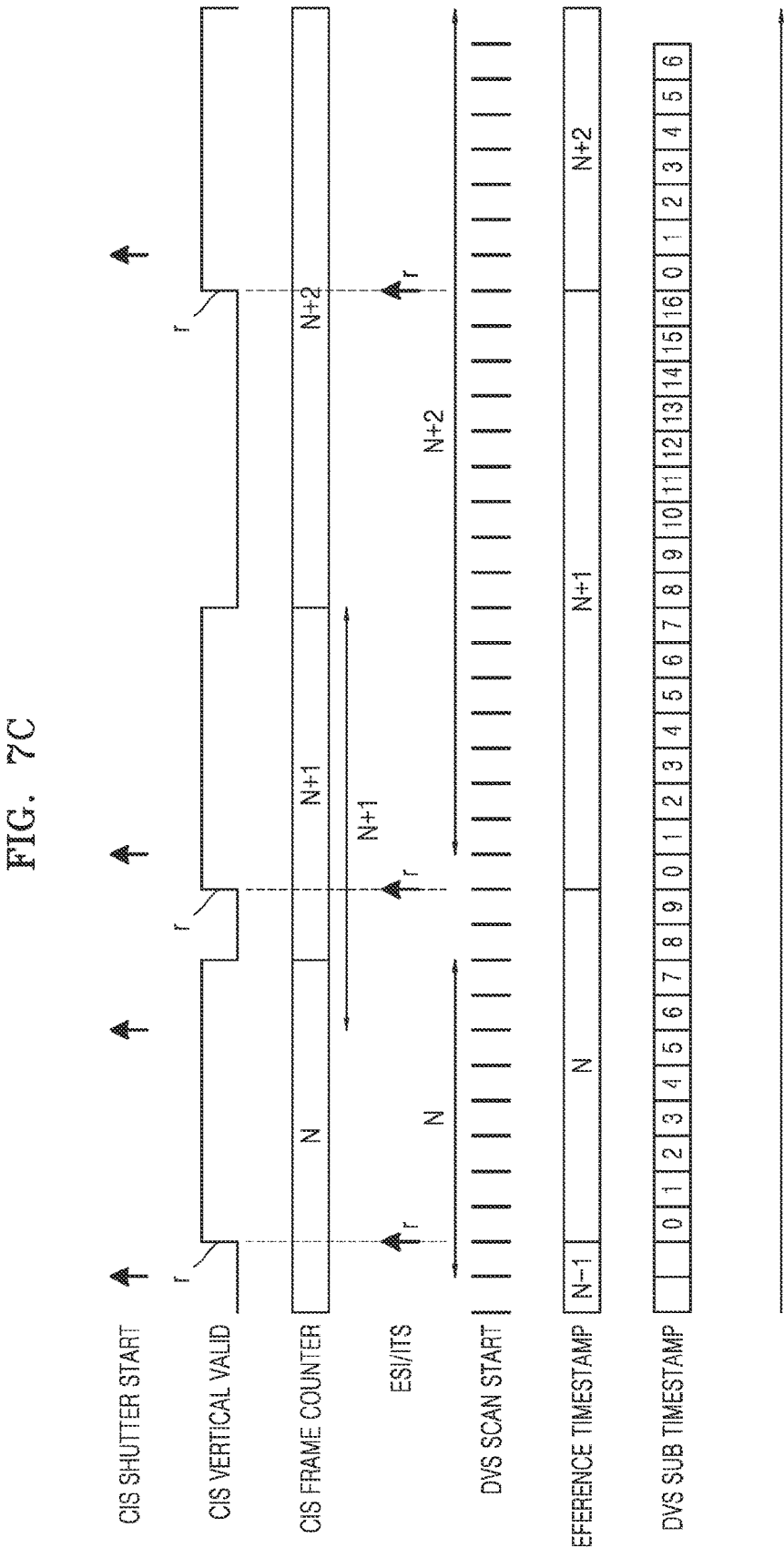

FIGS. 7A to 7C illustrate a method of generating the timestamp TS according to the external synchronization input signal ESI by the vision sensor 100 according to an embodiment of the present disclosure.

The synchronization control module 130 may generate the internal trigger signal ITS by receiving the external synchronization input signal ESI. The DTAG may generate the timestamp TS including a dynamic vision sensor (DVS) reference timestamp and a DVS sub timestamp based on the internal trigger signal ITS.

For example, the external synchronization input signal ESI may include a trigger signal transmitted from a complementary metal-oxide-semiconductor (CMOS) image sensor (CIS) to the vision sensor 100. The external synchronization input signal ESI may be generated based on a CIS shutter start signal, which is shutter information of an image sensor, and a CIS vertical valid signal indicating a readout time point. The internal trigger signal ITS may be generated the same as the external synchronization input signal ESI. A CIS frame counter may indicate a generation order of image frames generated by an image sensor. For example, the CIS frame counter may be increased whenever the CIS vertical valid signal in the image sensor 200 changes from high to low. For example, a DVS scan start may occur whenever an event frame is generated by the vision sensor 100, and the DVS sub timestamp may be increased by one whenever a DVS scan start signal is generated.

Referring to FIG. 7A, the image sensor 200 may generate the external synchronization input signal ESI at a CIS shutter start time point "c". The vision sensor 100 may increase the DVS reference timestamp by one whenever the internal trigger signal ITS is generated. The DVS sub timestamp may be increased by one whenever the DVS scan start signal is generated, and may be initialized when the DVS reference timestamp is increased. The processor 300 may match the vision sensor data VDT with the image data IDT by using a value of the DVS reference timestamp generated by the vision sensor 100 and a value of the CIS frame counter generated by the image sensor 200.

Referring to FIG. 7B, the image sensor 200 may transmit the external synchronization input signal ESI at a CIS shutter start time point "s" and a readout end time point "e". When a first DVS reference timestamp DVS reference timestamp 1 synchronized with the CIS shutter start time point "s" and a second reference timestamp DVS reference timestamp 2 synchronized with the readout end time point "e" are used, the value of the CIS frame counter may be accurately matched, and accordingly, the vision sensor data VDT may be more accurately matched with the image data IDT.

Referring to FIG. 7C, the image sensor 200 may transmit the external synchronization input signal ESI at a readout start time point "r". The vision sensor 100 may increase a DVS reference timestamp by one whenever the internal trigger signal ITS is generated. The processor 300 may match the vision sensor data VDT with the image data IDT by using values of the DVS reference timestamp and the DVS sub timestamp generated by the vision sensor 100 and the value of the CIS frame counter generated by the image sensor 200.

Figure 8:
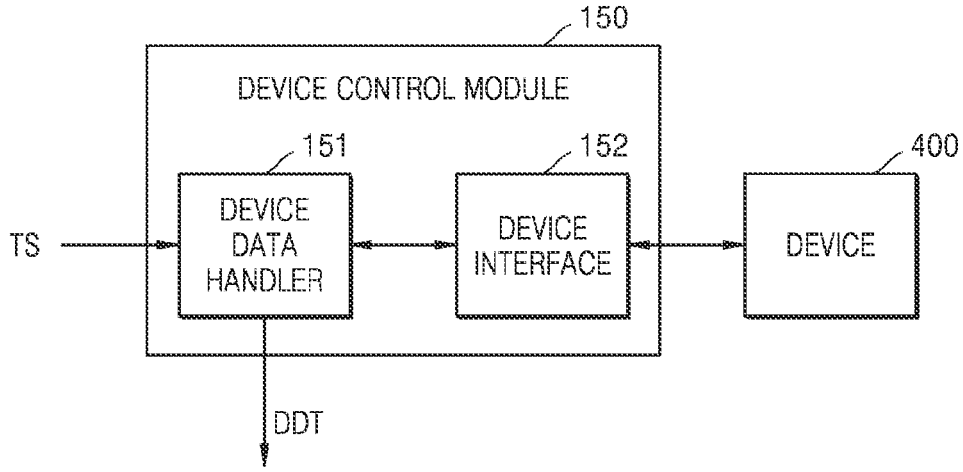
FIG. 8 is a block diagram illustrating a method of which a vision sensor synchronizes with an external device according to an embodiment of the present disclosure.

FIG. 8 illustrates a method of synchronizing the vision sensor 100 with the external device 400 according to an embodiment of the present disclosure.

The device control module 150 may include a device data handler 151 and a device interface 152.

The device data handler 151 may receive the timestamp TS generated by an event detection circuit (e.g., 120 of FIG. 2B) and synchronize the timestamp TS with data received from the external device 400 including an IMU, a gyro sensor, an IR LED, and a flashlight. The device data handler 151 may transmit the device data DDT including information of the timestamp TS to the interface circuit 140.

The device interface 152 may use various communication interfaces, and may communicate with the external device 400 by using, for example, a serial peripheral interface (SPI).

The external device 400 may include a gyro sensor, an IMU, an IR LED, or various camera sensors.

Figure 9:
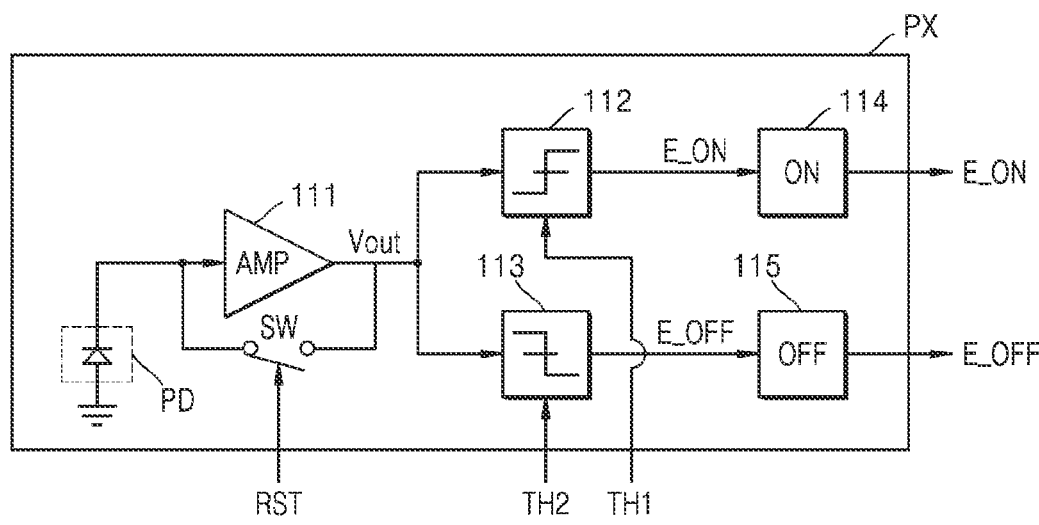
FIG. 9 is a circuit diagram illustrating an implementation example of a pixel.

FIG. 9 illustrates an implementation example of the pixel PX.

Referring to FIG. 9, the pixel PX may include a photoelectric conversion device PD, an amplifier 111, a first comparator 112, a second comparator 113, an on-event holder 114, an off-event holder 115, and a reset switch SW. In addition, the pixel PX may further include a capacitor for removing noise generated by the pixel PX or introduced from the outside, or various switches.

The photoelectric conversion device PD may convert incident light, that is, an optical signal, into an electrical signal, for example, a current. The photoelectric conversion device PD may include, for example, a photodiode, a phototransistor, a port gate, a pinned photodiode, or the like. The photoelectric conversion device PD may generate an electrical signal having a higher level as an intensity of incident light increases.

The amplifier 111 may convert the received current into a voltage and amplify the voltage level. An output voltage of the amplifier 111 may be provided to the first comparator 112 and the second comparator 113.

The first comparator 112 may compare an output voltage Vout of the amplifier 111 with an on-threshold voltage TH1, and generate an on-signal E_ON according to a comparison result. The second comparator 113 may compare the output voltage Vout of the amplifier 111 with an off-threshold voltage TH2 and generate an off-signal E_OFF according to a comparison result. When a variation amount of light received by the photoelectric conversion device PD is equal to or greater than a certain level of variation, the first comparator 112 and the second comparator 113 may generate the on-signal E_ON or the off-signal E_OFF.

For example, the on-signal E_ON may be at a high level when an amount of light received by the photoelectric conversion device PD increases to a certain level or more, and the off-signal E_OFF may be at a high level when an amount of light received by the photoelectric conversion device PD is reduced to a certain level or less. The on-event holder 114 and the off-event holder 115 may respectively hold the on-signal E_ON and the off-signal E_OFF and then output the same. When the pixel PX is scanned, the on-signal E_ON and the off-signal E_OFF may be output. As described above, when light sensitivity is adjusted, levels of the on-threshold voltage TH1 and the off-threshold voltage TH2 may be modified. For example, the photosensitivity light sensitivity may be reduced. Accordingly, the level of the on-threshold voltage TH1 may be increased and the level of the off-threshold voltage TH2 may be reduced. Therefore, when a variation in light received by the photoelectric conversion device PD is greater than before (that is, before the levels of the on-threshold voltage TH1 and the off-threshold voltage TH2 are modified), the first comparator 112 and the second comparator 113 may generate the on-threshold voltage TH1 or the off-threshold voltage TH2.

Figure 10:
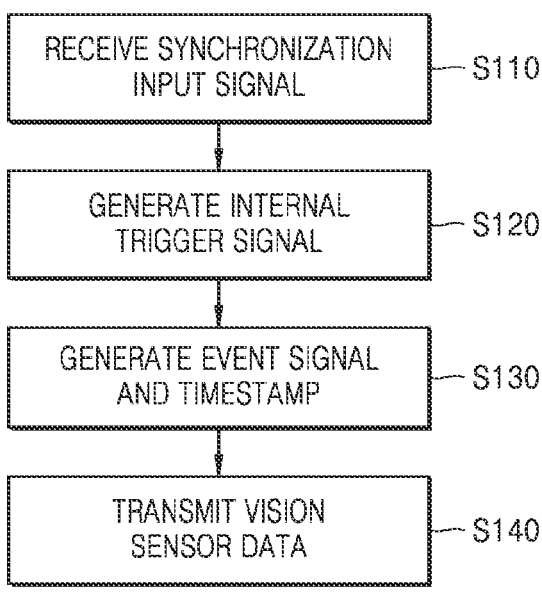
FIG. 10 is a flowchart diagram illustrating a synchronization method of a vision sensor according to an embodiment of the present disclosure.

FIG. 10 illustrates a synchronization method of the vision sensor 100 according to an embodiment of the present disclosure.

In operation S110, the vision sensor 100 receives a synchronization input signal. The vision sensor 100 may receive the synchronization input signal from an image sensor, but may also or alternately receive a signal generated by a device other than the image sensor, such as by the processor 300 or external device 400, without limitation thereto The synchronization input signal may be generated based on at least one of shutter signal information, read signal information, and image frame information of the image sensor. The shutter signal information may include information of a time point at which an exposure of a pixel of a pixel array starts or stops in a shuttering method. The read signal information may include information of a start time point or an end time point of a read operation detecting a reset voltage and a pixel voltage from pixels of the pixel array. The image frame information may include information of a time point at which generation of an image frame by the image sensor starts or ends.

In operation S120, the vision sensor 100 may generate an internal trigger signal based on the received synchronization input signal. At this time, in addition to the internal trigger signal, the vision sensor 100 may also generate at least one device synchronization signal for controlling an external device based on the received synchronization input signal. Setting a delay value or a pulse width from the synchronization input signal may be also performed in the internal trigger signal or the device synchronization signal. In addition, the internal trigger signal or the device synchronization signal may be set to operate in a single-in-trigger-mode in which one signal is generated when the synchronization input signal is generated, a burst-single-in-trigger-mode in which N preset signals are generated when the synchronization input signal is generated, or a continuous burst mode in which a plurality of preset signals are generated based on the synchronization input signal. The device synchronization signal may also be generated by using an internal signal of the vision sensor 100 instead of the synchronization input signal.

In operation S130, the vision sensor 100 may generate a timestamp based on the internal trigger signal while generating event signals. The timestamp may include matching information of an image frame generated by the image sensor and the event signal generated by the vision sensor 100. The timestamp may include a reference timestamp that increases a preset value when the internal trigger signal is generated and a sub timestamp that increases a preset value when the event signal is generated. For example, referring to FIGS. 7A to 7C, because a frame counter value for the image frame generated by the image sensor corresponds to the DVS reference timestamp generated by the vision sensor 100 by using the synchronization input signal and the DVS sub timestamp generated according to the event signal, it may be determined which event signal is matched with the image frame.

In operation S140, the vision sensor 100 may transmit the vision sensor data including the event signal and the timestamp to an external processor.

Figure 11:
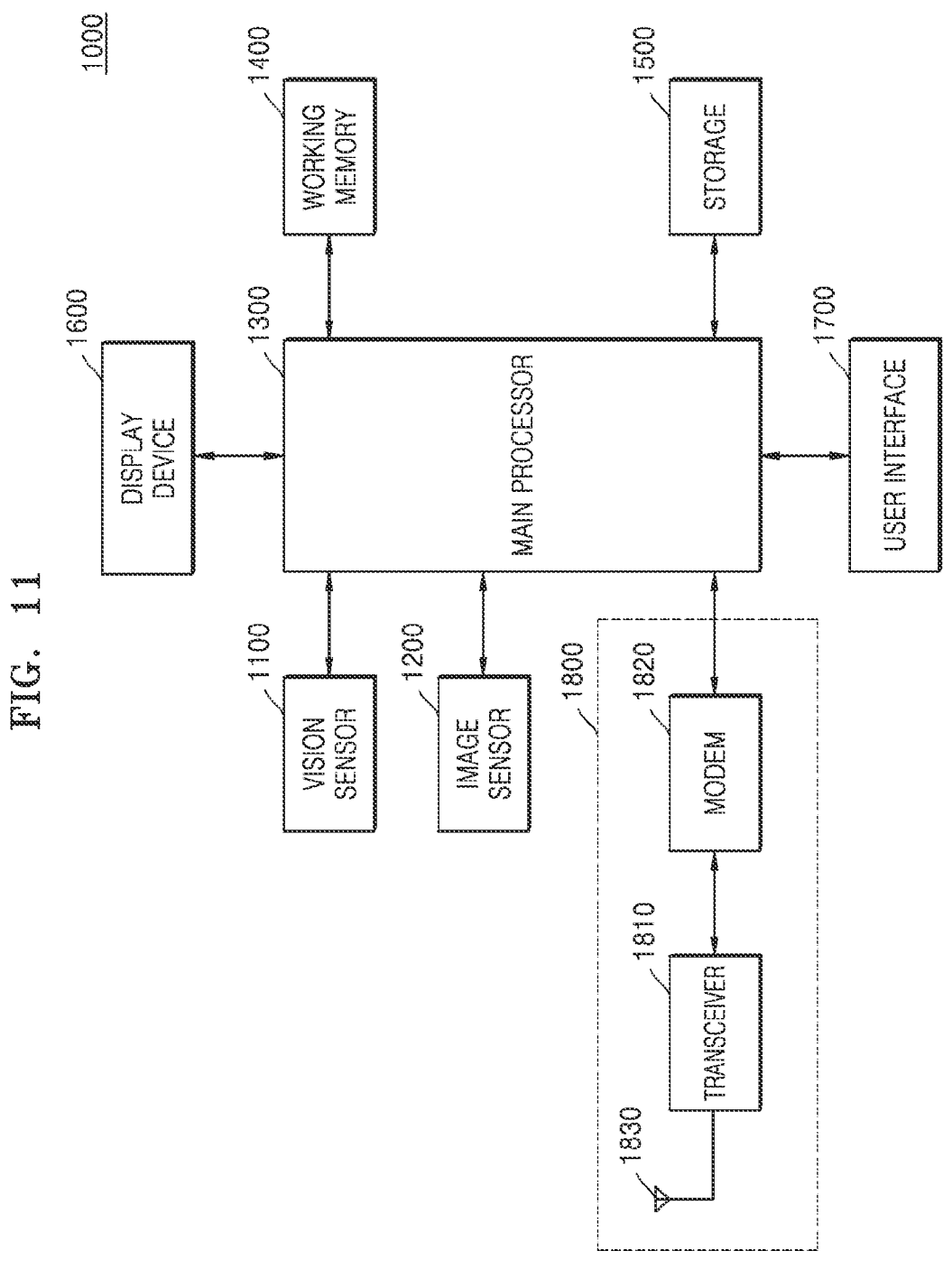
FIG. 11 is a block diagram illustrating an electronic apparatus to which a vision sensor according to an embodiment of the present disclosure is applied.

FIG. 11 illustrates an electronic apparatus 1000 to which a vision sensor 1100 according to an embodiment of the present disclosure is applied.

Referring to FIG. 11, the electronic apparatus 1000 may include the vision sensor 1100, an image sensor 1200, a main processor 1300, a working memory 1400, a storage 1500, a display device 1600, a communication unit 1800, and a user interface 1700.

The vision sensor 100 described with reference to FIGS. 1 to 10 may be applied as the vision sensor 1100. The vision sensor 1100 may generate an internal trigger signal based on a synchronization input signal received from the image sensor 1200, detect whether an event has occurred in each of a plurality of pixels, generate event signals corresponding to pixels in which the event has occurred, generate a timestamp based on the internal trigger signal, communicate with an external processor, and transmit vision sensor data including at least one of an event signal and the timestamp to the main processor 1300.

The image sensor 1200 may generate image data, for example, raw image data, based on a received optical signal and provide the image data to the main processor 1300.

The main processor 1300 may control all operations of the electronic apparatus 1000, and may detect movement of an object by processing the vision sensor data, that is, the event signal. In addition, the main processor 1300 may receive an image frame from the image sensor 1200 and perform image processing based on preset information.

The working memory 1400 may store data to be used for operations of the electronic apparatus 1000. For example, the working memory 1400 may temporarily store packets or frames processed by the main processor 1300. For example, the working memory 1400 may include a volatile memory such as dynamic random-access memory (DRAM), synchronous DRAM (SRAM), or the like, and/or a non-volatile memory such as phase-change RAM (PRAM), magneto-resistive RAM (MRAM), resistive RAM (ReRAM), ferroelectric (FRAM), or the like.

The storage 1500 may store data, of which storage is requested from the main processor 1300 or other components. The storage 1500 may include a non-volatile memory such as flash memory, PRAM, MRAM, ReRAM, FRAM, or the like.

The display device 1600 may include a display panel, a display driving circuit, and a display serial interface (DSI). For example, the display panel may include various devices such as a liquid crystal display (LCD) device, a light-emitting diode (LED) display device, an organic light-emitting diode (OLED) display device, an active matrix OLED (AMOLED) display device, or the like. The display driving circuit may include a timing controller, a source driver, or the like, needed to drive the display panel. A DSI host embedded in the main processor 1300 may perform serial communication with the display panel through the DSI.

The user interface 1700 may include at least one of input interfaces such as a keyboard, a mouse, a keypad, a button, a touch panel, a touch screen, a touch pad, a touch ball, a gyroscope sensor, a vibration sensor, an acceleration sensor, or the like.

The communication unit 1800 may exchange signals with an external device/system through an antenna 1830. A transceiver 1810 and a modulator/demodulator (MODEM) 1820 of the communication unit 1800 may process signals exchanged with an external device/system according to a wireless communication protocol such as Long-Term evolution (LTE), Worldwide Interoperability for Microwave Access (WIMAX), Global System for Mobile communications (GSM), Code Division Multiple Access (CDMA), Bluetooth, Near Field Communication (NFC), Wireless-Fidelity (Wi-Fi), Radio Frequency Identification (RFID), or the like.

Components of the electronic apparatus 1000, for example, the vision sensor 1100, the image sensor 1200, the main processor 1300, the working memory 1400, the storage 1500, the display device 1600, the user interface 1700, and the communication unit 1800, may exchange data according to at least one of various interface protocols such as universal serial bus (USB), small computer system interface (SCSI), mobile industry processor interface (MIPI), Inter-Integrated Circuit (I2C), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), nonvolatile memory express (NVMe), universal flash storage (UFS), or the like.

While the present disclosure has been particularly shown and described with reference to embodiments thereof, it will be understood by those of ordinary skill in the pertinent art that various changes in form and details may be made therein without departing from the spirit and scope of the following claims.

What is claimed is:

1. An image processing device comprising:
   a complementary metal-oxide-semiconductor image sensor (CIS) configured to generate image data of an object; and
   a vision sensor configured to receive a synchronization signal from the CIS and generate event signals of the object and a timestamp based on the synchronization signal,
   wherein the CIS is configured to transmit the image data to a single processor, and
   wherein the vision sensor is configured to transmit the event signals and timestamp to the single processor aperiodically.

2. The image processing device of claim 1, wherein the CIS and the vision sensor are implemented as a single chip.

3. The image processing device of claim 1, wherein the CIS, the vision sensor, and the processor are implemented as a single chip.

4. The image processing device of claim 1,
   wherein the vision sensor further comprises a voltage generator configured to generate threshold voltages to be used to detect events, and
   wherein the voltage generator is configured to change voltage levels of the threshold voltages.

5. The image processing device of claim 1, wherein the timestamp includes information of time where the event signals are generated.

6. The image processing device of claim 1, wherein the CIS is configured to generate the synchronization signal based on at least one of shutter signal information, read signal information and image frame information.

7. The image processing device of claim 4, wherein the voltage generator is configured to change the voltage levels of the threshold voltages to be provided to pixels of a region of interest (ROI).

8. The image processing device of claim 7, wherein the voltage generator is configured to differently change the voltage levels of the threshold voltages for each of a plurality of ROI.

9. The image processing device of claim 1,
   wherein the vision sensor further comprises an event detection circuit configured to generate a plurality of event signals between a period of a first image frame information of the CIS and a second image frame information of the CIS.

10. An image processing device comprising:
    a complementary metal-oxide-semiconductor image sensor (CIS) configured to generate image data of an object; and
    a vision sensor including:
       a first plurality of pixels configured to generate events in response to a change in light, the events being related to a movement of the object, and an event detection circuit configured to generate event signals based on the events and a synchronization signal received from the CIS, wherein the CIS is configured to transmit the image data to a single processor, wherein the event detection circuit is configured to process the events in a frame unit, wherein the vision sensor is configured to transmit the event signals and timestamp to the single processor, wherein the event detection circuit is configured to generate event signals N times between a period of a first image frame information of the CIS and a second image frame information of the CIS, and wherein N is an integer greater than 1.

11. The image processing device of claim 10, wherein the vision sensor further comprises a voltage generator configured to generate threshold voltages to be used to detect the events, and wherein the voltage generator is configured to change voltage levels of the threshold voltages.

12. The image processing device of claim 10, wherein the CIS and the vision sensor are implemented as a single chip.

13. The image processing device of claim 10, wherein the CIS is configured to generate the synchronization signal based on at least one of shutter signal information, read signal information, and image frame information.

14. The image processing device of claim 10, wherein the timestamp includes information of time where the event signals are generated.

15. The image processing device of claim 11, wherein the voltage generator is configured to differently change the voltage levels of the threshold voltages for each of a plurality of regions of interest (ROI).

16. An image processing device comprising:

a complementary metal-oxide-semiconductor image sensor (CIS) configured to generate image data of an object; and a vision sensor including:

a first plurality of pixels configured to generate events in response to a change in light, the events being related to a movement of the object, and an event detection circuit configured to generate event signals based on the events and a synchronization signal received from the CIS, wherein the CIS and the vision sensor are configured to transmit the image data and the event signals to a single processor, wherein the vision sensor is configured to transmit the event signals to the single processor periodically, and wherein the event detection circuit is configured to process the events in a frame unit.

17. The image processing device of claim 16, wherein the vision sensor further comprises a voltage generator configured to generate threshold voltages to be used to detect the events, and wherein the voltage generator is configured to change voltage levels of the threshold voltages.

18. The image processing device of claim 16, wherein the CIS is configured to generate the synchronization signal based on at least one of shutter signal information, read signal information, and image frame information.

19. The image processing device of claim 16, wherein the event detection circuit is configured to generate event signals N times between a period of a first image frame information of the CIS and a second image frame information of the CIS, and wherein N is an integer greater than 1.

20. The image processing device of claim 16, wherein the CIS and the vision sensor are implemented as a single chip.

* * * * *